H. H. C. ARNOLD.
Improvement in Animal Traps.
No. 124,027.
Patented Feb. 27, 1872.
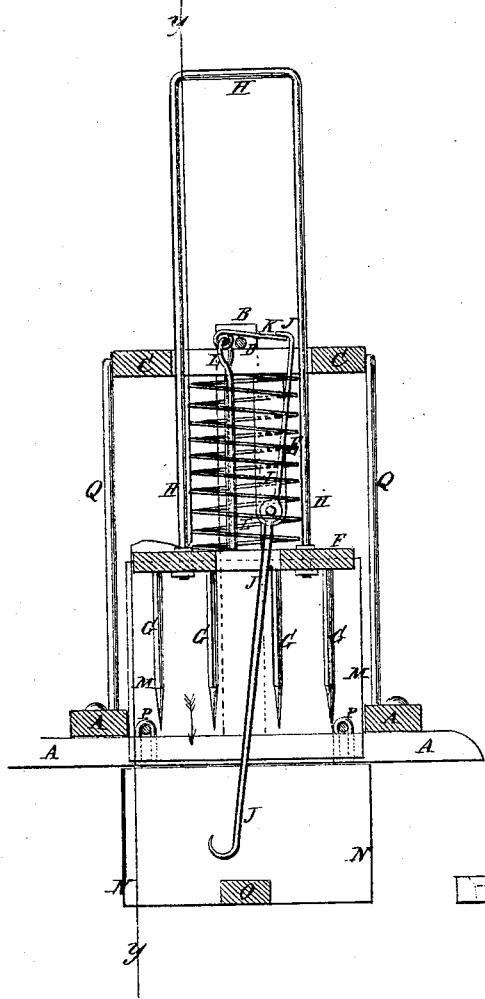
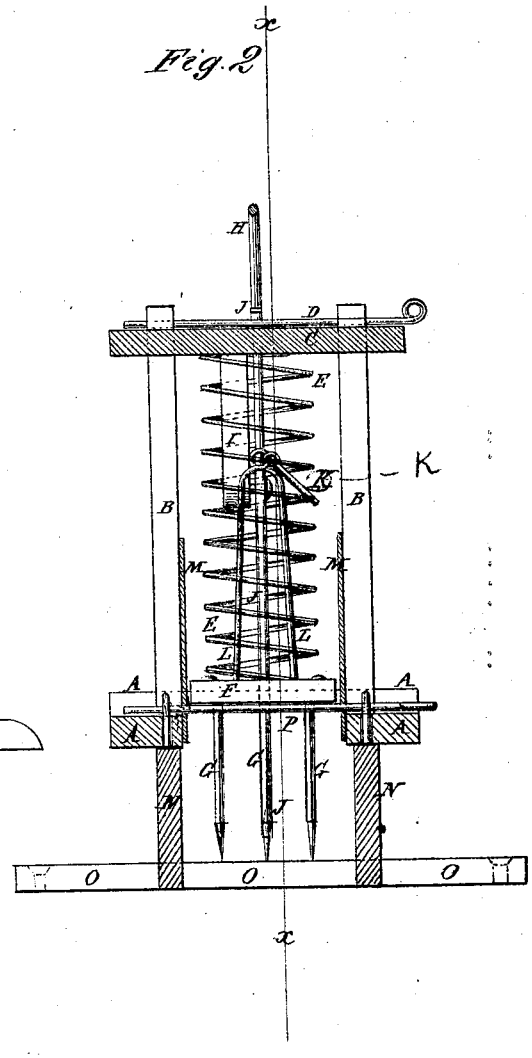
Witnesses:
A. W. Almquist
Geo. W. Mabee
Inventor:
H. H. C. Arnold
per
Attorneys.

124,027

UNITED STATES PATENT OFFICE.

HUDSON H. C. ARNOLD, OF BURLINGTON, KANSAS.

IMPROVEMENT IN ANIMAL-TRAPS.

Specification forming part of Letters Patent No. 124,027, dated February 27, 1872.

Specification describing a new and Improved Animal-Trap, invented by HUDSON H. C. ARNOLD, of Burlington, in the county of Coffey and State of Kansas.

Figure 1 is a vertical longitudinal section of my improved trap taken through the line $x\,x$, Fig. 2. Fig. 2 is a vertical cross-section of the same taken through the line $y\,y$, Fig. 1.

Similar letters of reference indicate corresponding parts.

My invention has for its object to furnish an improved trap for catching rats, mice, moles, &c., which shall be simple in construction, inexpensive in manufacture, convenient in use, and effective and reliable in operation; and it consists in the construction and combination of the various parts of the trap, as hereinafter more fully described.

A is a frame, to the middle parts of the side bars of which are attached the lower ends of two uprights B, to the upper ends of which is attached a top board, C, by means of a long pin, D, which also acts as a support to the catch-lever when the trap is set. To the under side of the top board C is attached a wire spring, E, the lower end of which is attached to or rests upon the platform F. To the under side of the platform F are attached the upper ends of a series of rods, G, the lower ends of which are made sharp, so that they may be readily forced into or through the animal that springs the trap by the force of the springs E. To the upper side of the platform F are attached the ends of a loop or bail, L, which passes up through a slot in the top board C and serves as a handle for drawing up the platform F in setting the trap. To the under side of the middle part of the top board C is attached an arm, I, which projects down within the spring E, and to the side of the lower end of which is pivoted the lever J, the upper end of which projects through the slot in the top board C, and has a catch-hook formed upon its upper end to catch upon the end of the catch-lever K, which is pivoted to a loop or rod, L, attached to the middle part of the platform F, and which projects upward within the spring E. The lower part of the lever J projects downward through a slot in the middle part of the platform F, and has a hook formed upon its lower end to receive the bait. M are guide-plates attached to the uprights B or to the frame A, and which cause the platform to move up and down vertically. To the lower side of the frame A are detachably attached the upper edges of two plates or boards, N, the lower edges of which are connected and held in their proper relative positions by a cross-bar, O, the ends of which project, and have holes formed in them to receive the screws by which the trap is secured to the floor or other support when set for rats, mice, &c. The boards or plates N may be secured to the frame A by long pins or rods P, which rods or pins P also serve as guides to the pointed rods G to cause them and the platform F to move up and down vertically, and as guards to support the pointed rods G against the animal's efforts to escape if it be not instantly killed. Q are guide-rods, the upper ends of which are attached to the ends of the top board C, and the lower ends of which are attached to the end bars of the frame A. The guide-rods H are designed to cause the platform F to move up and down in a vertical direction.

In setting the trap for moles the boards or plates N and the cross-bar O are detached. The soil thrown up by the mole is smoothed off level with the surface of the ground; the trap is then placed longitudinally in the passage-way of the mole, and the bait-hook J forced down into the said passage-way. The trap may be secured in place when adjusted by passing the rod P down into the ground through holes in the frame A. With this arrangement, when the mole finds his passage-way obstructed by the end of the lever J he attempts to remove it, which springs the trap, and the rods G are forced into or through him. In setting the trap the platform F and pointed rods G are drawn up and the spring E compressed by means of the loop or bail L; the lever K is then passed over the rod D and its end is caught upon the catch-hook of the lever J, which sets the trap.

Having thus described my invention, I claim as new and desire to secure by Letters Patent—

1. The combination of the frame A, uprights B, top board C, rod D, coiled wire spring E, platform F, pointed rods G, loop or bail L, arm I, lever J, catch-lever K, guide-rod H, guide-plates M, and rods P and Q with each other, substantially as herein shown and described, and for the purpose set forth.

2. Combination of the frame A, uprights B, top board C, rod D, coiled wire spring E, platform F, pointed rods G, loop or bail L, arm I, lever J, catch-lever K, guide-rod H, guide-plates M, boards or plates N, cross-bar O, and rods P and Q with each other, substantially as herein shown and described, and for the purpose set forth.

HUDSON H. C. ARNOLD.

Witnesses:
   HENRY VAN ARSDALE,
   BISHOP A. HOLLAND.